United States Patent
Berglund et al.

(10) Patent No.: US 9,204,663 B2
(45) Date of Patent: Dec. 8, 2015

(54) SODIUM-FREE SALT SUBSTITUTE

(75) Inventors: Kris A. Berglund, Okemos, MI (US);
Erik A. Berglund, Okemos, MI (US);
Dianne Holman, legal representative,
Okemos, MI (US)

(73) Assignee: Working Bugs, LLC, East Lansing, MI (US)

( * ) Notice: Subject to any disclaimer, the term of this patent is extended or adjusted under 35 U.S.C. 154(b) by 0 days.

(21) Appl. No.: 14/240,475

(22) PCT Filed: Aug. 23, 2012

(86) PCT No.: PCT/US2012/052035
§ 371 (c)(1),
(2), (4) Date: May 7, 2014

(87) PCT Pub. No.: WO2013/028845
PCT Pub. Date: Feb. 28, 2013

(65) Prior Publication Data
US 2014/0234525 A1   Aug. 21, 2014

Related U.S. Application Data

(60) Provisional application No. 61/575,650, filed on Aug. 25, 2011.

(51) Int. Cl.
*A23L 1/22*     (2006.01)
*A23L 1/237*    (2006.01)

(52) U.S. Cl.
CPC .................................. *A23L 1/2375* (2013.01)

(58) Field of Classification Search
CPC ...... A23L 1/2375; A23L 1/204; A23L 1/3051
USPC .................................. 426/74, 649, 478, 495
See application file for complete search history.

(56) References Cited

U.S. PATENT DOCUMENTS

| 4,931,305 A | 6/1990 | Karppanen et al. |
| 5,173,323 A | 12/1992 | Omari |

(Continued)

FOREIGN PATENT DOCUMENTS

| EP | 0377119 A1 | 7/1990 |
| TR | 2010 06993 A2 | 2/2011 |

(Continued)

OTHER PUBLICATIONS

International Search Report and Written Opinion dated Jan. 4, 2013.

(Continued)

*Primary Examiner* — Helen F Heggestad
(74) *Attorney, Agent, or Firm* — Butzel Long

(57) ABSTRACT

A composition that is a substitute for food grade sodium chloride includes crystalline particles containing both potassium chloride and lysine monohydrochloride such that the potassium chloride and lysine monohydrochloride are not susceptible to separation. A process for making the composition includes steps of providing a supersaturated water solution of potassium chloride and lysine monohydrochloride at a temperature of from about 10 to about 70° C., adding ethanol to the solution in an amount sufficient to precipitate crystalline particles containing a combination of potassium chloride and lysine monohydrochloride, separating the crystalline particles from the solution, and drying the crystalline particles.

6 Claims, 1 Drawing Sheet

(56) References Cited

U.S. PATENT DOCUMENTS

| | | |
|---|---|---|
| 5,527,959 A | 6/1996 | Berglund et al. |
| 5,897,908 A * | 4/1999 | Berglund et al. ............. 426/649 |
| 2001/0043942 A1 | 11/2001 | Hasegawa et al. |
| 2009/0104330 A1 | 4/2009 | Zasypkin |
| 2009/0117254 A1 | 5/2009 | Chigurupati |
| 2009/0214728 A1 | 8/2009 | Ley et al. |

FOREIGN PATENT DOCUMENTS

| | | |
|---|---|---|
| WO | WO-2008/096040 A1 | 8/2008 |
| WO | WO-2012/026899 A1 | 3/2012 |

OTHER PUBLICATIONS

EP Foreign Office Action, dated Dec. 19, 2014, 8 pages.

Pinho, Simão P., and Macedo, Eugénia A., "Solubility of NaCl, NaBr, and KCl in Water, Methanol, Ethanol and Their Mixed solvents," *Journal of Chemical Engineering Data* 2 (2005): vol. 50, 29-32, 4 pages.

Zhao, Dishun, Duan, Qian Li, Erhong, Shen, Hongsheng Li, Xiaobing, "Solubility of L-Lysine Hydrochloride in Dimethyl Sulfoxide, Methanol, Ethanol, Water, and Glycol between (283 and 323) K." *Journal of Chemical Engineering Data* (2009): vol. 54, 2126-7, 2 pages.

Ferreira, Luisa A., Macedo, Eugénia A., Pinho, Simão P., "KCl Effect on the Solubility of Five Different Amino Acids in Water," *Fluid Phase Equilibria* 255(2007): 131-7, 7 pages.

Uusi-Penttilä, Saku Marketta, "Optimization of Batch Anti-Solvent Crystallization," PhD dissertation, Michigan State University, 1997, 123 pages.

* cited by examiner

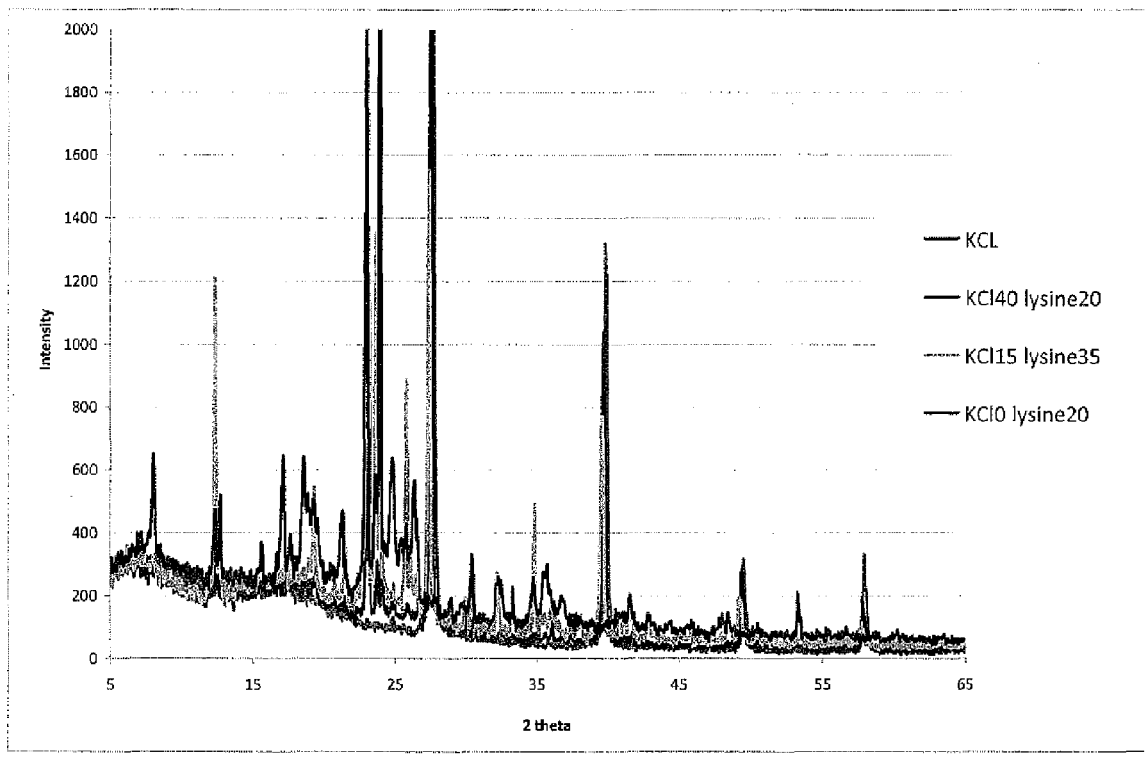

SODIUM-FREE SALT SUBSTITUTE

CROSS-REFERENCE TO RELATED APPLICATIONS

This application claims the benefit of PCT Application No. PCT/US2012/052035 filed Aug. 23, 2012 and U.S. Provisional Application No. 61/575,650 filed Aug. 25, 2011, which are hereby incorporated by reference in their entireties.

FIELD OF THE DISCLOSURE

This disclosure relates to food-grade sodium chloride substitutes.

DESCRIPTION OF PRIOR ART

Health effects such as hypertension have been directly linked to the excess consumption of dietary salt (sodium chloride) in a number of studies. It is widely recognized that an important element of combating hypertension is the simultaneous reduction of sodium while increasing the consumption of potassium in the diet. Recently, the U.S. Government has released a new set of standards reducing the recommended daily allowance of sodium from 2300 mg to 1300 mg. In addition, the requirement for potassium has been set at 4700 mg.

While some products have used the strategy of mixing sodium chloride with potassium chloride to reduce sodium consumption (see references in U.S. Pat. No. 5,897,908), there are few products on the market that are sodium-free. Potassium chloride by itself has a bitter, metallic taste and some sort of masking agent must be used to cover this taste. Previously, it was discovered (K. A. Berglund and H. Alizadeh, U.S. Pat. No. 5,897,908 Apr. 27, 1999) that lysine monohydrochloride, an essential amino acid to human nutrition, was able to effectively mask this taste. The compositions disclosed in U.S. Pat. No. 5,897,908 are a physical mixture of potassium chloride (KCl) and lysine monohydrochloride (LMC) crystals that provide a salty taste.

SUMMARY OF THE DISCLOSURE

Described herein are improved substitutes for food grade sodium chloride that provide a salty taste. Such compositions comprise crystalline particles containing both potassium chloride (KCl) and lysine monohydrochloride (LMC). Further, the compositions can have a ratio of KCl to LMC that is between about 90:10 and 60:40 by weight. In certain embodiments, the compositions can have a ratio of KCl to LMC that is between about 65:35 and 75:25.

Also disclosed is a process for providing a composition which is a substitute for food grade sodium chloride. The process includes steps of (a) providing a supersaturated water solution of potassium chloride (KCl) and lysine monohydrochloride (LMC) at a temperature between about 10 and 70° C.; (b) adding ethanol to the solution in an amount sufficient to precipitate crystalline particles containing a combination of LMC and KCl; (c) separating the crystalline particles from the solution; and (d) drying the crystalline particles to provide the composition in a flowable form. In certain embodiments, the water solution is prepared using water that was ultrafiltered. In certain embodiments, the weight ratio of co-precipitated KCl to LMC is between about 90:10 and 60:40. In certain embodiments, the weight of KCl to LMC ratio is between about 65:35 and 75:25. In certain embodiments, ethanol is separated from the water, recycled and reused. The ethanol used in the process can be an azeotrope with water obtained by a conventional distillation, or an anhydrous alcohol obtained by a process such as pressure-swing distillation, azeotrope distillation with a benign entrainer such as pentane, or with molecular sieves.

BRIEF DESCRIPTION OF THE DRAWING

FIG. 1 is a graph of the x-ray diffraction powder patterns of crystals produced by anti-solvent crystallization from aqueous mixtures of KCl and LMC.

DETAILED DESCRIPTION

U.S. Pat. No. 5,897,908 disclosed a physical mixture of the two crystal types, which presented problems in commercialization that were not anticipated. In particular, the two crystals tended to segregate during shipping and/or use. In addition, the two crystals are generally not produced commercially in such a way that they dissolve at the same rate. This difference in dissolution caused difficulties in processing, and, when used in place of table salt, a difference in taste.

The novel process of preparing a KCl/LMC substitute for sodium chloride involves co-precipitation of the two species in a new type of crystalline, particulate form. The highly innovative process disclosed herein uses biobased solvents to achieve the desired result. The new product generates a single crystalline particulate material in which the chemical species cannot be segregated. Independent taste trials demonstrate that the crystalline particulate products disclosed herein have a taste that is favored as compared to the physical mixture described in U.S. Pat. No. 5,897,908. The new product was used in cracker baking and it was found superior in performance in eliminating ordinary table salt (i.e., sodium chloride) completely.

EXAMPLES

Crystallization conditions were determined for the production of the co-crystallized potassium chloride and monohydrochloride. Previous studies by Pinho and Macedo (2005) and Zhao et al. (2009) determined the solubility of KCl and LMC in ethanol/water mixtures, respectively. In each case, it was found that the solubilities of each pure compound reached approximately zero in pure ethanol. Other authors have found a synergistic effect of solubility between KCl and amino acids, but the effect is relatively small and was not considered important in the current work (Ferreira et al., 2007). Uusi-Penttilä (1997) showed that LMC could be crystallized from aqueous solution by addition of ethanol.

In order to crystallize a substance, it is required to create supersaturation. This can be achieved in a number of ways, but in the current work, the use of an anti-solvent crystallization approach was applied. The procedure for the crystallization was to prepare a solution of water with KCl and lysine monohydrochloride (LMC) at a concentration at or near saturation. All studies were conducted at room temperature, approximately 20° C. The ratio of KCl to lysine monohydrochloride was varied from 90:10 to 60:40. Ethanol was slowly added with stirring until a volume ratio of about four times the volume of ethanol was added to the initial volume of water used in the solution. The products (KCl and LMC) were co-crystallized from solution at high yield and were filtered and dried. Segregation is prevented because the KCl and LMC are intimately combined in a single crystal type. In addition, the starting LMC had a light brown color and the KCl was completely white. Most of the color remained in the ethanol solution, but the resulting crystals had a uniform color indicating a single crystal type. Taste properties were assessed. The resulting taste profiles are shown in Table 1.

TABLE 1

Effect of the composition on salty taste of co-crystallization crystals.

| Ratio of KCl:LMC, mass basis | Resulting taste |
|---|---|
| 80:20 | Salty, but some bitterness |
| 70:30 | Salty |
| 60:40 | Less salty |

Powder pattern x-ray diffraction is a well established analytical tool to determine the presence of different crystal phases. A series of x-ray diffraction powder patterns were developed for different mass ratios of KCl to LMC. The results are shown in FIG. 1. The x-ray diffraction patterns show that the crystalline nature of the LMC is lost as the KCl content rises, as evidenced by loss of reflections. While the data suggests there is some type of amorphous LMC in the presence of the KCl, which could be a coating, it is apparent that the products of the novel processes disclosed herein are not the same as physical mixtures of the two crystals, since the reflections for individual crystals of the two chemical species have not been retained. Thus, the compositions disclosed herein are not necessarily comprised entirely of crystals and may more appropriately be designated as crystalline particles, which encompass purely crystalline products, as well as precipitates comprising a combination of crystalline and amorphous materials in which the amorphous materials may be occluded, coated on to, or otherwise intimately associated with the crystals. Notably, the crystalline particles that are co-precipitated as disclosed herein produce an x-ray diffraction pattern that does not have peaks at 2 theta values of approximately 8, 15 and 53, which are characteristic of crystals comprised of LMC alone.

A novel crystallization procedure has been developed to produce a new type of crystalline particulate material that has improved taste and physical properties for the replacement of dietary sodium chloride. The starting solution concentration of potassium chloride (KCl) and lysine monohydrochloride (LMC) can be approximately 30 weight percent in water. Examples of suitable ratios of KCl:LMC can range from 9:1 to 6:4 by weight, such as from about 65:35 to 75:25 by weight. Crystallization can be achieved by addition of ethanol to achieve a final range of ratio of ethanol to water from 3:1 to 6:1, such as 4:1 to 5:1. The x-ray diffraction powder pattern of the resulting crystalline particles indicates the presence of a new lysine phase.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

What is claimed is:

1. A process for providing a composition which is a substitute for food grade sodium chloride, which comprises:
   (a) providing a supersaturated water solution of potassium chloride (KCl) and lysine monohydrochloride (LMC) at a temperature between about 10 and 70° C.;
   (b) adding ethanol to the solution in an amount sufficient to precipitate crystalline particles that contain both LMC and KCl;
   (c) separating the crystalline particles from the solution; and
   (d) drying the crystalline particles to provide the composition in a flowable solid particulate form.

2. The method of claim 1 wherein the water is ultrafiltered.

3. The method of claim 1 wherein the weight ratio of KCl to LMC is between about 90:10 and 60:40.

4. The method of claim 1 wherein the weight ratio of KCl to LMC is between about 65:35 and 75:25.

5. The method of claim 1 wherein the ethanol is separated from the water, recycled and reused.

6. The method of claim 1 wherein the ethanol is provided as an azetrope with water.

* * * * *